METER FOR REGISTERING HIGH-RATE FLOW VOLUME
Filed May 4, 1956 3 Sheets-Sheet 1
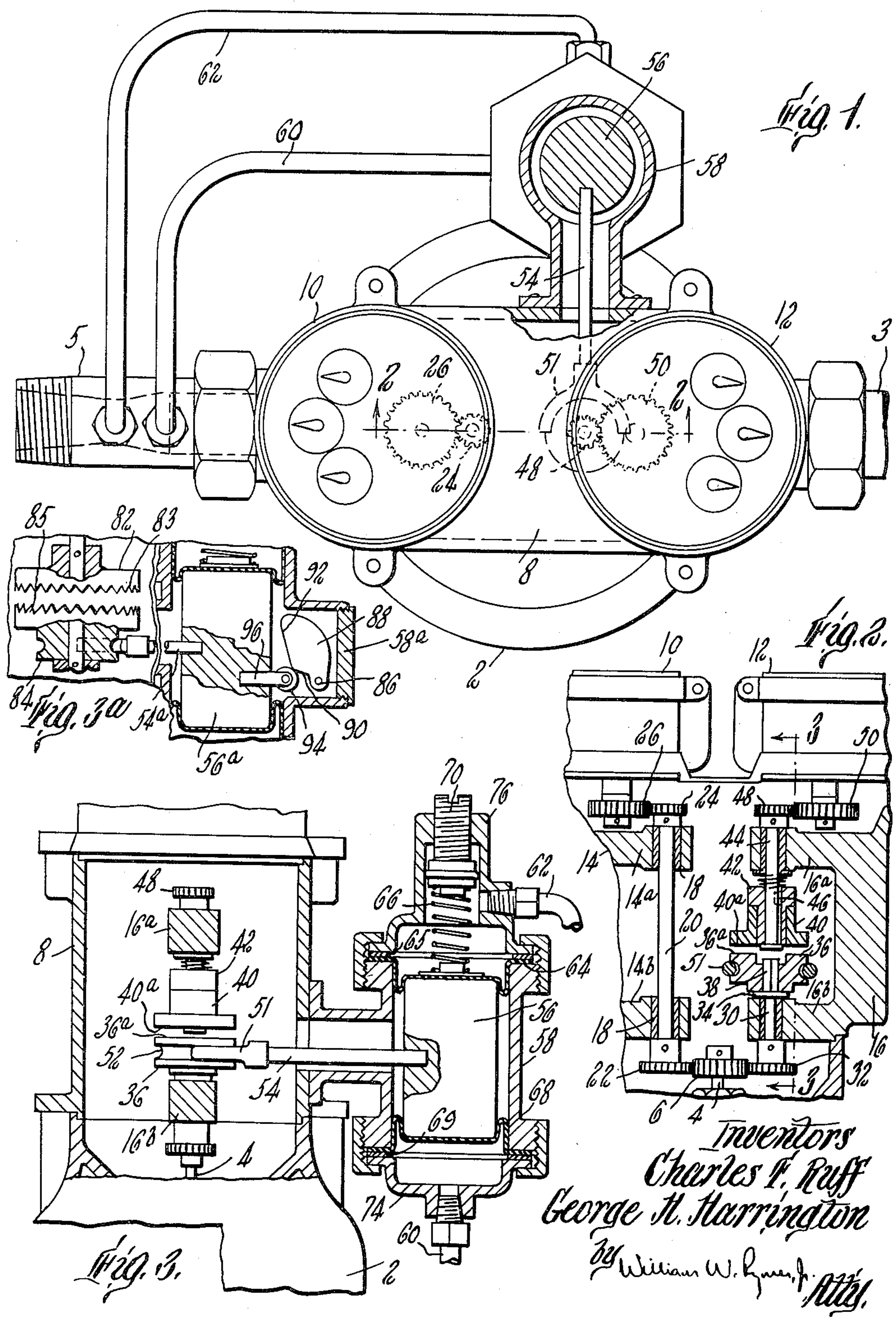

July 5, 1960 G. H. HARRINGTON ET AL 2,943,484

METER FOR REGISTERING HIGH-RATE FLOW VOLUME

Filed May 4, 1956 3 Sheets-Sheet 2

Inventors
Charles F. Ruff
George H. Harrington
by William W. Ryan, Jr. Atty.

METER FOR REGISTERING HIGH-RATE FLOW VOLUME
Filed May 4, 1956 3 Sheets-Sheet 3
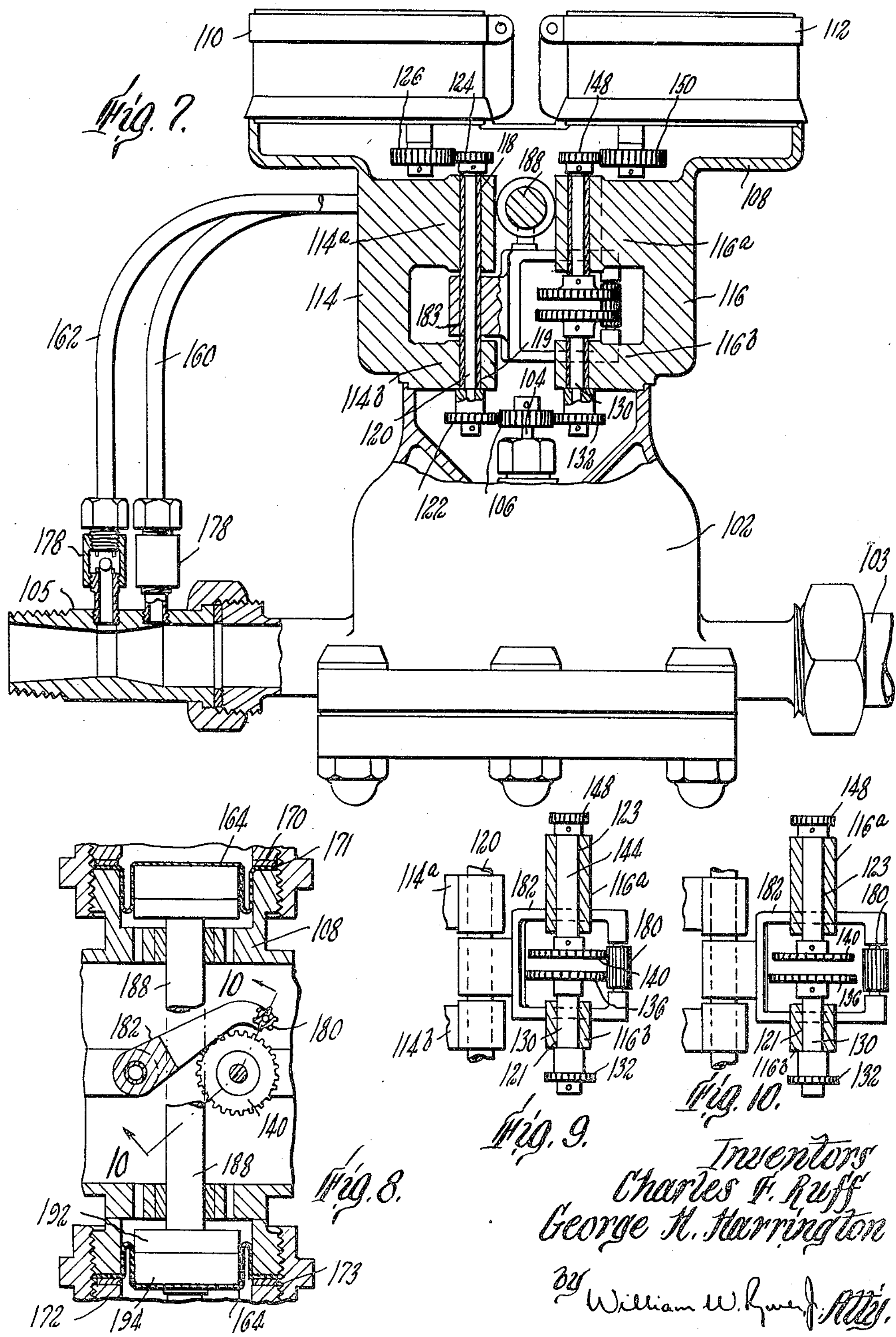
Inventors
Charles F. Ruff
George H. Harrington
By William W. Rymer Jr. Atty.

United States Patent Office 2,943,484 Patented July 5, 1960

2,943,484

METER FOR REGISTERING HIGH-RATE FLOW VOLUME

George H. Harrington, Quincy, Mass., and Charles F. Ruff, New York, N.Y.; said Harrington assignor to said Ruff Filed May 4, 1956, Ser. No. 582,707

6 Claims. (Cl. 73—197)

This invention relates to fluid flow meters, and more particularly to such meters which register volume of flow therethrough taking place under flow rate conditions above a predetermined minimum flow rate.

One object of the present invention is to make possible a surcharge on users of water for other than normal purposes. Heavy occasional consumer demands, as for air conditioners and lawn sprinklers, impose special burdens of expansion of reservoirs and other water facilities. It is desirable thus that consumers making such unusual demands on the water supply be charged at a higher rate for the water so used. It is an object of the invention to make possible registering not only the total volume of flow, for which charges may be made at the usual rates, but additionally the volume of flow taking place at higher rates, for which a suitable surcharge may then be charged.

It is accordingly an object of this invention to provide such a meter in which volume of flow taking place at rates above a predetermined minimum rate is registered.

A further object is to provide such a meter in which there are a pair of registers, one for each of the purposes above described, one register being driven continuously by flow of fluid through the meter, and the other register being driven only during periods when rate of flow is above a predetermined minimum.

A further object is to provide such a meter in which there is clutch means operating when flow rate rises above the predetermined minimum to engage the previously idle register and thereupon cause the same to be driven until flow rate again drops below said predetermined minimum.

Further objects are to provide such clutch means which effect engagement with the second register accurately when flow rate reaches the predetermined amount, and effect disengagement when flow rates drop therebelow; which will not tend to stick, jam, or otherwise become inoperative; and which will not slip or otherwise cause inaccurate registering.

Another object is to prevent undesirable leakage in the event of failure or wear of various of the parts.

Other objects, advantages, and features will appear from the following description of preferred embodiments of the invention, taken in conjunction with the attached drawings thereof, in which:

Fig. 1 is a plan view, partially in section, of a presently preferred embodiment of the invention;

Fig. 2 is a partial sectional view taken at 2—2 of Fig. 1;

Fig. 3 is a partial sectional view taken at 3—3 of Fig. 2;

Figure 4:
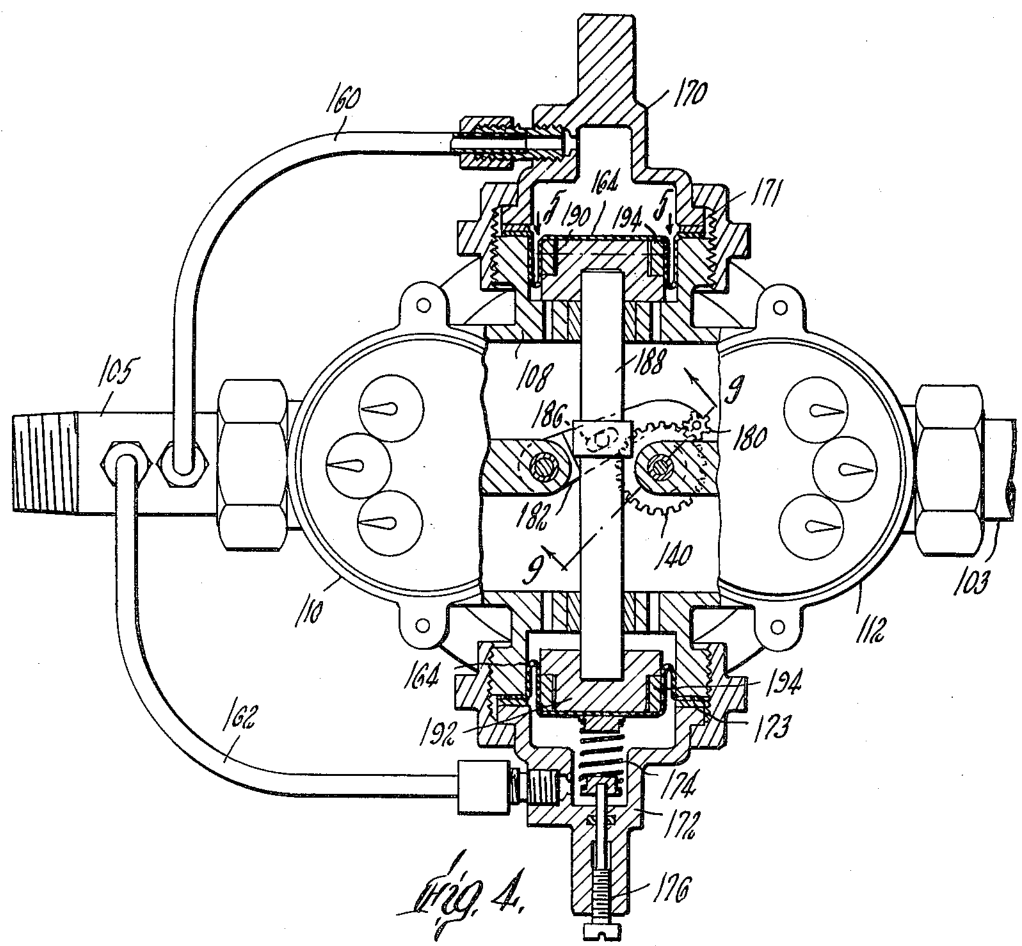
Figure 6:
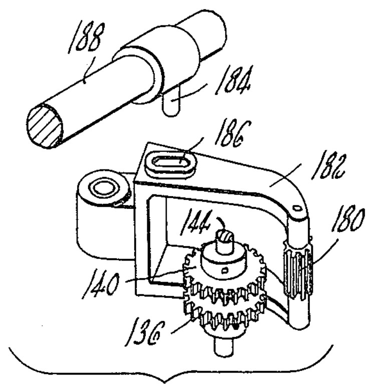
Figure 5:
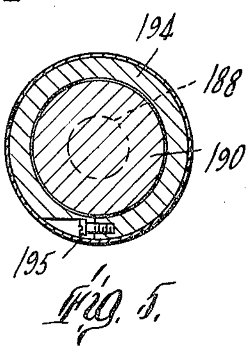

Fig. 3*a* is a partial sectional view, corresponding to Fig. 3, of a modified embodiment of the invention;

Fig. 4 is a plan view, partially in section, of another modified embodiment of the invention;

Fig. 5 is a sectional view of a portion thereof, taken at 5—5 of Fig. 4;

Fig. 6 is an exploded isometric view of the clutch of said embodiment together with an end of the arm actuating it;

Fig. 7 is a side elevation, partially in section, of said modified embodiment;

Fig. 8 is a partial sectional view corresponding to Fig. 4 but showing in greater detail the clutch mechanism;

Fig. 9 is a partial sectional view taken at 9—9 of Fig. 4; and

Fig. 10 is a view corresponding with Fig. 9, except that the clutch is shown disengaged.

Referring now to the drawings there is shown in Figs. 1 through 3 a presently preferred embodiment of the invention. The numeral 2 designates a meter-casing containing any suitable form of measuring mechanism which imparts rotation to a spindle 4 proportionate to the volume of liquid passing therethrough; as shown for example in United States Patents to Tilden, Numbers 729,701 and 1,567,345. Mounted on the end of the spindle 4 for rotation thereby is a driving gear 6. Water enters the meter through inlet pipe 3 and emerges through venturi 5.

Mounted above the meter-casing 2 is an upper housing 8 in the top of which are mounted total flow volume register 10 and high rate flow volume register 12. Integral with the upper housing 8 and extending oppositely inwardly therefrom are a pair of C-shaped bearings 14 and 16, with upper bearing portions **14*a* and 16*a*, and lower bearing portions 14*b* and 16*b*, respectively. Each said bearing portion is vertically drilled therethrough to accept an anti-friction composition bushing 18** adapted to accept rotatably therethrough shafts as hereinafter described.

Extending through the upper and lower bearing portions of the bearing 14 is a single shaft 20. At the lower end thereof is mounted the gear 22, which meshes with the gear 6. At the upper end of the shaft 20 is mounted the gear 24, which in turn meshes with gear 26 which actuates the total flow register 10.

Extending through the bushing 18 within the lower bearing portion **16*b* is a short shaft 30, on the lower extremity of which is mounted gear 32, which engages gear 6. Above the bearing portion 16*b* and spaced therefrom by a spacer 34 is a hard rubber lower clutch member 36. The shaft 30 is cylindrical in its lower portions within said spacer 34 and bearing portion 16*b*, but has a larger and hexagonal cross section 38 above said spacer 34. The lower clutch member 36 has a corresponding vertical hexagonal hole therein, so that the same is vertically slidable with respect to the shaft 30, for engagement and disengagement with the upper clutch member 40, also of hard rubber, fixed around metal insert 42. The upper clutch member 40 is adjustably mounted on an upper short shaft 44 by means of a set screw 46 extending through the insert 42. The clutch members 36 and 40 rotate about a common vertical axis. At the upper end of the shaft 44 is mounted a gear 48, in engagement with gear 50 which drives the high rate register 12. Gears 24, 26, 48 and 50** are change gears.

The lower clutch member is actuated vertically upward to engage the upper clutch member by bringing into frictional contact the flat hard rubber surfaces **36*a* and 40*a* thereof, by means of a yoke 51 which clasps the lower clutch member 36 in groove 52 therearound. The yoke 51 is connected by rod 54 to a plunger 56, which is vertically movable within a housing 58** responsive to pressure differential operating thereupon as hereinafter described.

The space in the housing 58 above the plunger 56 is sealed off therefrom by a flexible diaphragm 64 clamped around its outer edge by ring 65 and the space below the plunger is sealed off therefrom by a similar flexible diaphragm 68, and clamp ring 69. These diaphragms may suitably be made of elastomeric material incorporating reinforcing cords in the unsupported portions thereof, of the character made and sold by the Bellofram Corporation, 144 Moody Street, Waltham, Massachusetts. The space in the pressure zone housing 74 below the plunger 56 communicates through pipe 60 with the high pressure side of venturi 5 which causes increased pressure drop at increased rates of flow, without undue permanent loss of head, while the space above the plunger, defined by pressure zone housing 76, ring 65, and diaphragm 64 communicates through pipe 62 with the low pressure portion, or constriction, of said venturi. The plunger is biased in a downward direction an amount governed by the weight thereof and the compression under which the spring 66 is put by means of the adjustable screw 70. The amount of bias is regulated so that the plunger will only move upward, to produce engagement of the clutch, when a pressure differential across the venturi corresponding to a predetermined minimum flow rate is established. Adjustment of the flow rate at which clutch engagement takes place may be made not only by adjusting screw 70, but also larger adjustments may be made by replacing the venturi with one of different size.

The plunger housing 58 communicates with the upper housing 8 to provide a passage through which the rod 54 extends, said passage being large enough to permit the required upward and downward movement of said plunger.

In operation, whenever water flows through the meter, the total volume register 10 is driven through spindle 4, gear 6, gear 22, shaft 20, gear 24, and gear 26 to register the same. Whenever flow rate rises above a predetermined minimum flow rate, the differential pressure drop in the venturi becomes sufficiently great to overcome the bias produced on the plunger 56 by the spring 66 and the weight of said plunger. Thereupon the plunger moves upward, taking with it through the connecting rod 54 and the yoke 51 the lower clutch member 36. The flat hard rubber upper surface thereof then engages the flat hard rubber lower surface of the upper clutch member 40 and by virtue of friction therebetween drives the upper clutch member, which in turn drives the high rate register 12 through shaft 44, gear 48, and gear 50. The high rate meter 12 thus registers the volume of flow taking place at rates above said predetermined minimum.

A modified embodiment of the invention is shown in Fig. 3*a*. This embodiment is similar to the embodiment just described, except that for the upper and lower clutch plates 40 and 36 there has been substituted metal upper clutch member 82 and metal lower clutch member 84, the former having a serrated lower surface 83 and the latter having a meshing serrated upper surface 85, so as to provide positive drive therebetween when engaged. Another difference is that in this embodiment there is provided, pivotally mounted on pin 86 within housing **58*a* a weight 88 having lower and upper cam surfaces 90 and 92 respectively. These surfaces are engaged by roller 94 rotatably mounted on pin 96, which is nonmovably seated in plunger 56*a*. The cam surfaces are arranged so that relatively large upward force must be applied by the plunger 56*a* to drive the roller 94 along the lower cam surface 90, and relatively less upward force is thereafter required to drive the same along the upper cam surface 92. This arrangement prevents the upper and lower clutch members' wearing away the outer portions of the serrations, as would otherwise be the tendency, since at certain conditions of pressure differential the serrations would touch without firmly engaging, and tend to wear down said serrations. The weight, cam surfaces, and roller arrangement is such that while the roller moves along the lower cam surface 90, the clutch members are entirely out of engagement, and by the time the roller moves onto the upper cam surface 92 there has already been built up in producing movement along the lower cam surface sufficient pressure-differential to throw the clutch members into fully positive engagement, and at the same time permit the roller to move up the upper cam surface 92, on which leverage against the weight 88** is so much better that said weight then offers little resistance to the roller.

Another modified embodiment of the invention is shown in Figs. 4 through 10.

In this embodiment water enters through pipe 103, passes through a meter-casing 102 containing mechanism to impart rotation to spindle 104, proportionate to volume of flow, and emerges through venturi 105. The total volume register 110 is continuously driven during flow conditions by spindle 104 through gear 106, gear 122, shaft 120, gear 124, and gear 126.

Integral with the upper housing 108 and extending oppositely inwardly therefrom are a pair of C-shaped bearings 114 and 116, with upper bearing portions **114*a* and 116*a* and lower bearing portions 114*b* and 116*b* respectively. The shaft 120 extends through a pair of composition bushings 118 and 119 seated in holes extending through the upper and lower bearing portions 14*a* and 14*b*** respectively.

A short shaft 130 extends through a bushing 121 which is seated in a vertical hole through the bearing portion **116*b* and has secured to the lower end thereof a gear 132 driven by gear 106. To the upper end of the shaft 130 is affixed clutch driving gear 136. This gear is driven continuously during flow conditions by the spindle 104**.

A second short shaft 144 extends through bushing **116*a* mounted in vertical hole in bearing portion 116*a*, directly above the shaft 130. To the lower end of the shaft 144 is affixed clutch driven gear 140, which has a slightly smaller outside diameter, and shorter teeth than gear 136**.

In this embodiment the clutch gear 180, carried by the clevis 182, which is pivotally mounted through bushing 183 on shaft 120, serves to positively transmit rotation from the gear 136 to the gear 140 when flow rates rise above a predetermined minimum, the clutch gear 180 being of width greater than the vertical distance between gears 136 and 140, and being moved into and out of engagement with them by pin 184 extending through elongated hole 186 in the clevis 182, the pin 184 being driven back and forth by connecting rod 188 on which it is mounted. The connecting rod 188 is secured at its opposing ends in piston heads 190 and 192. An adjustable ring 194, shown in detail in Fig. 5, encircles each said piston head at the outer extremity thereof, so that by means of the screw 195 the effective diameters of the piston heads may be adjusted and balanced. Overlying the outer surfaces of each piston head 190 and 192, and adjustable rings 194, is a flexible diaphragm 164 of the character above described. These diaphragms 164 are secured around their periphery between the upper housing 108 and clamping rings 171 and 173, adjacent pressure zone housing members 170 and 172 respectively. Pressures are communicated to the pressure zone chambers within said pressure zone housing members, which are sealed off by the diaphragms 164, through pipes 160 and 162, from the input or high-pressure and constriction or low-pressure portions of the venturi 105 respectively. Inside the enclosure member 172 is a spring 174 which may be adjusted to varying compressive forces by means of screw 176 to give varying degrees of biasing to the low-pressure side.

Included in the lines 160 and 162 are ball check valves 178, which permit small flows but not large flows, to eliminate substantial leakage in the event of diaphragm failure in the meter. Should a diaphragm fail, for example, the rush of water would raise a ball against an upper seat and cut off the flow. These ball check valves seat upwardly if flow is substantial, but do not seat to prevent downward flow of water. The lower seat may for example have a square hole, so water may always flow through at the corners, around the ball.

In operation, the total volume flow register 110 is driven continuously during all flow conditions by the spindle 104 and associated gears and shafts, as above described. So long as flow rate is below a predetermined minimum, however, although gear 136 rotates continuously during flow conditions (driven by spindle 104 through gear 132, and shaft 130), the clutch gear 180 remains out of engagement therewith, so that no rotation is transmitted to the gear 140. When the difference in pressure between the inlet and constriction portions of the venturi 105 rises to an amount corresponding with a predetermined flow rate, however, the bias effected by the spring 174 and the pressure within the enclosure 172 is overcome by the pressure within the enclosure 170, driving the piston head 190 through the flexible diaphragm 164 horizontally toward the low pressure enclosure 172, as shown in Fig. 4. The flexible diaphragms permit motion without leakage of water. The connecting rod 188 and attached pin 184 is moved correspondingly, and acting within the hole 186 of the clevis 182 the said pin causes the latter to move pivotally on the shaft 120, to bring the clutch gear into engagement with the gears 136 and 140. Thereupon rotation is transmitted through shaft 144 and gears 148 and 150 to drive the high rate volume register 112.

An advantage of using the venturi as flow rate responsive means is that accuracy of engagement and disengagement of the clutch at the rate desired is not affected by changes in the accuracy of the total volume measurement and spindle rotation. If desired the venturi may for economy be formed of sheet copper and secured within pipe by gripping its extremities between pipe flanges.

Inasmuch as the rotating gear 136 is of diameter larger than the initially stationary gear 140, if the clutching gear 180 should at first at an outer diameter thereof come in contact with an outer diameter of gear 136, the turning action of the latter would soon permit the teeth of the clutch gear 180, pressing against it, to mesh with it. Then, the gear 140 being smaller in diameter, if the clutch gear 180 should at an outer diameter thereof abut an outer diameter of the gear 140, the turning gear 180 jogs the gear 140 until meshing takes place. A similar effect can be had by making the gears 136 and 140 of the same size, but making the lower portion of the clutch gear of slightly larger diameter than the upper. Either construction prevents inoperativeness that might be caused if an outer diameter of the clutch gear first butted against an outer diameter of the stationary gear 140.

It will be apparent that if desired, means may be provided to insure that the clutch gear is either altogether out of contact with the other gears, or else firmly pressing toward positive engagement therewith, to minimize wear on the gear teeth. For example, means involving a weight with cam surfaces, and a roller associated with the connecting rod 188, similar to that shown in Fig. 3*a* and described in connection therewith, might desirably be used for the purpose.

Instead of being responsive directly to differential pressure, as in the embodiments described above, the flow rate responsive means may be directly responsive to increase in torque between a magnet and a copper armature, caused to rotate relatively to each other in proportion to the speed of rotation of the spindle above referred to. Or if responsive to differential pressure, the same may be taken across an orifice, or for that matter across the water meter itself, if desired, rather than in a venturi.

The invention is useful not only on water meters having a single register for registering total flow volume, but on compound meters as well. Normally it will be desirable to use the high-rate volume register of the invention in association with the volume register which becomes operative at the higher rates of flow.

Other embodiments within the spirit of the invention will occur, the embodiments described being illustrative merely.

We claim:

1. In a liquid flow volume meter for registering volume of flow taking place at rates above a predetermined minimum flow rate and including measuring mechanism which imparts rotation to a spindle directly proportionate to the total volume of flow, the combination which comprises a lower driving clutch member vertically slidably mounted and operatively connected with said spindle for rotation thereby, said lower clutch member having a flat hard rubber upper surface, an upper driven clutch member normally spaced from said lower driving member and having a flat hard rubber lower surface, a high-rate flow volume register operatively connected with said upper driven member to be in turn driven by the same, a vertically movable plunger connected with said lower driving clutch member to impart vertical movement to the latter, a pair of flexible diaphragms secured around the peripheries thereof and resting respectively against the top and bottom of said plunger, each said flexible diaphragm defining with an outer enclosing housing a pressure zone acting through the respective diaphragm on said plunger, a venturi for passage of said total volume of flow therethrough, a line through which the inlet portion of said venturi communicates with the said pressure zone below said plunger, a line through which the constriction portion of said venturi communicates with the said pressure zone above said plunger, and biasing means urging said plunger downwardly with a total force such that the plunger is urged upwardly to engage the said upper driven clutch member with the said lower driving clutch member only when the flow rate is above said predetermined minimum to give a corresponding pressure drop in said venturi.

2. In a liquid flow volume meter for registering volume of flow taking place at rates above a predetermined minimum flow rate and including measuring mechanism which imparts rotation to a spindle directly proportionate to the total volume of flow, the combination which comprises a driving clutch member slidably mounted and operatively connected with said spindle for rotation thereby, a driven clutch member normally spaced from said driving member, a high-rate flow volume register operatively connected with said driven member to be in turn driven by the same, a movable plunger connected with said driving clutch member to impart movement to the latter, toward and away from said driven clutch member, means for correspondingly moving said plunger responsive to changes in pressure drop caused by variations in rate of flow, and biasing means urging said plunger and therewith said driving clutch member away from said driven clutch member with a total force such that the plunger is urged by pressure differential to engage the said driven clutch member with the said driving clutch member only when the flow rate is above said predetermined minimum.

3. In a liquid flow volume meter for registering volume of flow taking place at rates above a predetermined minimum flow rate and including measuring mechanism which imparts rotation to a spindle directly proportionate to the total volume of flow, the combination which comprises a driving clutch member slidably mounted and operatively connected with said spindle for rotation thereby, a driven clutch member normally spaced from said driving member, a high-rate flow volume register operatively connected with said driven member to be in turn driven by the same, a movable plunger connected with said driving clutch member to impart movement to the latter toward and away from said driven clutch member, a pair of flexible diaphragms secured around the peripheries thereof and resting respectively against the opposed ends of said plunger, each said flexible diaphragm defining with an outer enclosing housing a pressure zone acting through the respective diaphragm on said plunger, pressure drop responsive means for passage of said total volume of flow therethrough, lines from said pressure drop responsive means communicating respectively with each said pressure zone, and biasing means urging said plunger and therewith said driving clutch member away from said driven clutch member with a total force such that the plunger is urged by pressure differential to engage the said driven clutch member with the said driving clutch member only when the flow rate is above said predetermined minimum.

4. The combination of claim 2 in which said clutch members include mating irregular surfaces for positive drive.

5. The combination of claim 4 which includes also anti-wear means for holding said clutch members completely out of contact until said pressure differential is sufficient to drive said clutch members into complete engagement.

6. The combination of claim 5, in which said anti-wear means includes a pivotally mounted weight having a lower cam surface and an upper cam surface, and a roller operatively connected with one said clutch member and to roll along said surfaces to lift said weight, said weight through said lower cam surface retarding movement of said roller to hold said last-mentioned clutch member out of contact with the other said clutch member until said pressure differential is sufficient to drive said clutch members into complete mesh.

References Cited in the file of this patent

UNITED STATES PATENTS

| | | |
|---|---|---|
| 1,108,721 | Dodge | Aug. 25, 1914 |
| 1,198,617 | Chrisman | Sept. 19, 1916 |
| 1,307,337 | Bassett | June 24, 1919 |
| 1,725,428 | Tilden | Aug. 20, 1929 |
| 1,732,689 | Marden | Oct. 22, 1929 |
| 2,084,396 | Hennessy | June 22, 1937 |
| 2,169,048 | Howe et al. | Aug. 8, 1939 |
| 2,316,198 | Van Den Berg | Apr. 13, 1943 |
| 2,391,852 | Winton | Dec. 25, 1945 |

FOREIGN PATENTS

| | | |
|---|---|---|
| 384,383 | Great Britain | Dec. 8, 1932 |
| 497,583 | Great Britain | Dec. 19, 1938 |